US008674805B2

(12) United States Patent
Charych

(10) Patent No.: US 8,674,805 B2
(45) Date of Patent: Mar. 18, 2014

(54) ACCESS CONTROL SYSTEM AND METHOD USING RADIO-FREQUENCY IDENTIFICATION AND IMAGING

(75) Inventor: Harold Charych, Poquott, NY (US)

(73) Assignee: Mountain Pass Systems, LLC, Poquott, NY (US)

( * ) Notice: Subject to any disclaimer, the term of this patent is extended or adjusted under 35 U.S.C. 154(b) by 913 days.

(21) Appl. No.: 12/825,640

(22) Filed: Jun. 29, 2010

(65) Prior Publication Data

US 2011/0001606 A1 Jan. 6, 2011

Related U.S. Application Data

(60) Provisional application No. 61/269,994, filed on Jul. 2, 2009.

(51) Int. Cl.

| | |
|---|---|
| ***B60R 25/00*** | (2013.01) |
| ***G05B 19/00*** | (2006.01) |
| ***G05B 23/00*** | (2006.01) |
| ***G06F 7/00*** | (2006.01) |
| ***G06F 7/04*** | (2006.01) |
| ***G08B 29/00*** | (2006.01) |
| ***G08C 19/00*** | (2006.01) |
| ***H04B 1/00*** | (2006.01) |
| ***H04B 3/00*** | (2006.01) |
| ***H04Q 1/00*** | (2006.01) |
| ***H04Q 9/00*** | (2006.01) |

(52) U.S. Cl.
USPC ....... 340/5.7; 340/5.52; 340/5.82; 340/572.1; 340/572.7; 340/572.2; 340/10.1; 340/5.71

(58) Field of Classification Search
USPC ........................................................... 340/5.7
See application file for complete search history.

(56) References Cited

U.S. PATENT DOCUMENTS

| | | | | |
|---|---|---|---|---|
| 4,574,860 A * | 3/1986 | Weiss | ........................... | 160/118 |
| 5,661,286 A | 8/1997 | Fujioka | | |
| 6,310,581 B1 | 10/2001 | Stockhammer | | |
| 6,522,772 B1 * | 2/2003 | Morrison et al. | ............. | 382/124 |
| 6,617,960 B1 | 9/2003 | Fischer et al. | | |
| 6,799,726 B2 | 10/2004 | Stockhammer | | |
| 7,084,736 B2 | 8/2006 | Ritter | | |
| 7,183,895 B2 | 2/2007 | Bazakos et al. | | |
| 7,337,963 B2 * | 3/2008 | Harper et al. | ................. | 235/385 |
| 7,360,695 B2 | 4/2008 | Ponert et al. | | |

(Continued)

FOREIGN PATENT DOCUMENTS

| | | | |
|---|---|---|---|
| JP | 7146961 | A | 6/1995 |
| JP | 7243292 | A | 9/1995 |
| JP | 11304473 | A * | 11/1999 |
| WO | 2006031255 | A2 | 3/2006 |

OTHER PUBLICATIONS

SkiPass-System. Axess AG. 2009 web page printout of http://www.teamaxess.com/en/systems/skipass.htm.
AX 500 Product Folder Axess AG. Nov. 3, 2009.

(Continued)

*Primary Examiner* — George Bugg
*Assistant Examiner* — Anthony D Afrifa-Kyei
(74) *Attorney, Agent, or Firm* — Brown & Michaels, PC

(57) ABSTRACT

The invention provides an access control system and method for ski areas or similar facilities which uses a combination of RFID enabled tags and video-image derived biometric information to control access through an access gate.

43 Claims, 14 Drawing Sheets

(56) References Cited

U.S. PATENT DOCUMENTS

| | | | | |
|---|---|---|---|---|
| 7,371,977 | B1 * | 5/2008 | Preonas | 174/383 |
| 7,404,517 | B2 | 7/2008 | Wallerstorfer et al. | |
| 7,513,423 | B2 | 4/2009 | Kocznar et al. | |
| 7,631,806 | B2 * | 12/2009 | Wallerstorfer et al. | 235/382 |
| 2004/0088584 | A1 * | 5/2004 | Shachar et al. | 713/201 |
| 2006/0118059 | A1 * | 6/2006 | Turner | 119/484 |
| 2007/0069010 | A1 | 3/2007 | Mestres et al. | |
| 2007/0252001 | A1 * | 11/2007 | Kail et al. | 235/380 |
| 2007/0290630 | A1 * | 12/2007 | Kim | 315/308 |
| 2008/0024278 | A1 * | 1/2008 | Volpi et al. | 340/10.1 |
| 2009/0032585 | A1 * | 2/2009 | Kocznar et al. | 235/382 |
| 2010/0146737 | A1 * | 6/2010 | Kunnath et al. | 16/415 |
| 2011/0108790 | A1 * | 5/2011 | Cromie et al. | 256/73 |

OTHER PUBLICATIONS

O'Connor, Mary Catherine."Alta Opts for RFID Lift Tickets" RFID Journal. Jun. 4, 2008 http://www.rfidjournal.com/article/print/4110.

O'Connor, Mary Catherine. "Vail Picks New Line With UHF RFID-Powered Passes" RFID Journal. Jul. 15, 2008 http://www.rfidjournal.com/article/print/4193.

SKIDATA Solutions for Mountain Destinations; SKIDATA AG. 2010 web page printout of http://www.skidata.com/Mountain-Destinations.54.0.html?&L=1.

Comparison Photo Check; SKIDATA AG. 2010 web page printout of http://www.skidata.com/Kamera-Fotovergleich.1048.0.html?kwypohorgxeijohn&L=1.

Freedom Gate. SKIDATA AG. 2010 web page printout of http://www.skidata.com/Freemotion-Gate.69.0.html?&L=1.

M. E. Hoffman and E. K. Wong, "A ridge-following algorithm for finding the skeleton of a fuzzy image," Information Sciences, vol. 105, pp. 227-238, Mar. 1998.

Ryszard Klempous, "Biometric Motion Identification Based on Motion Capture", chapter from "Towards Intelligent Engineering and Information Technology" L.J. Rudas et al (Eds.), SCI 243, Springer-Verlag, Berlin, Germany, pp. 335-348 (2009).

* cited by examiner

ACCESS CONTROL SYSTEM AND METHOD USING RADIO-FREQUENCY IDENTIFICATION AND IMAGING

REFERENCE TO RELATED APPLICATIONS

This application claims one or more inventions which were disclosed in Provisional Application No. 61/269,994, filed Jul. 2, 2009, entitled "NON INTRUSIVE BIOMETRIC VERIFICATION FOR SKI LIFT ACCESS". The benefit under 35 USC §119(e) of the United States provisional application is hereby claimed, and the aforementioned application is hereby incorporated herein by reference.

BACKGROUND OF THE INVENTION

1. Field of the Invention

The invention pertains to the field of access control systems. More particularly, the invention pertains to access control using radio-frequency identification and biometrics.

2. Description of Related Art

Ski areas need to verify that users of ski lifts have purchased valid tickets. What is typically done in most ski areas is that the ticket is manually inspected by a ski lift operator. Since the lift operator is also responsible for skier safety in using the lift, a second person will most likely handle the lift ticket verification. This manual process is labor intensive and generally does not provide satisfactory results. The inspections are usually cursory and the inspector is easily distracted, allowing many skiers through with no inspection at all.

Some ski areas have added automation to the process by having inspectors with hand held scan guns scanning the barcode on the lift ticket of those waiting on line. This process is better than manual inspection because the bar code will specify the date and duration of the ticket and if it is valid when scanned. The scan gun provides an audible signal if the ticket is not valid. This process is also labor intensive and during peak times, the inspector will just randomly scan some tickets while letting most skiers pass without scanning. Scanning also does not prevent the sweetheart fraud where the inspector will let their friends onto the lift lines without scanning their tickets.

With the introduction of high quality, low cost ink jet printers and paper scanners, bar coded tickets can be readily copied on these devices and printed on photo quality paper. The resulting copied ticket may not look exactly like the original but the copied barcode will scan the same as the original. The lift operators are conditioned to hear a "beep" to know that the ticket was properly scanned and do not spend any time visually verifying the authenticity of the ticket. This might make barcode scanning even worse than visual inspection for verifying ticket authenticity.

One of the most pervasive lift ticket scams being perpetrated on ski areas is unauthorized ski lift ticket transfers. A person may buy a lift ticket for someone else, but when that someone else uses the lift ticket at a ski lift, he/she becomes the owner of the ticket and is not allowed by legal code (in most states) to transfer that ticket to another person. Even though the transfer is illegal, it is difficult to enforce and is widely done by skiers that purchase lift tickets. As an example, a skier with bad knees that buys a full day lift ticket may decide to quit skiing during the lunch break and will offer the ticket to another skier who stayed up the night before and wants to ski only in the afternoon. For the ski area this is a loss of almost a full day's lift ticket revenue because afternoon lift tickets are only slightly discounted to full day lift tickets. Another example is a purchaser of a multi-day lift ticket that decides to ski for fewer days. He/she can resell the ticket to another skier who only wants to ski for the day that the ticket is not being used.

The situation is even worse for season passes that are offered at substantial discounts compared to single and multi-day lift tickets. There may be many days that the pass purchaser decides not to ski and will offer the pass to another skier who now does not have to buy a lift ticket. All of these unauthorized ticket transfers create a substantial revenue loss for the ski area.

Photos of persons authorized to use the lift tickets have been printed on the faces of season passes to help the lift operator verify that only authorized persons are using the lift ticket. This provides limited help because the photo on the season pass is relatively small and with the protective clothing worn by a skier, such as goggles or a ski mask that completely covers the face, it becomes very difficult for the operator to make any kind of positive identification of the skier and compare that to the miniature photo printed on the lift ticket. Other ways have been tried to make the identification of the skier easier such as scanning a bar code on the lift ticket and using the code to pull a photo of the skier from a database. This photo can be placed on a large monitor. Although this makes viewing of the photo easier, it does not make identification easier if the skier has the face covered with protective clothing. Most ski areas would consider it an affront to their customers if they asked them to remove items of clothing.

Other ski areas have automated the process further by installing gates and radio frequency identification (RFID) technology to determine ticket validity. The RFID technology that is used at these areas is high frequency (HF). HF technology has a read range that is typically around 3 ft. The RFID inlays that are used in each ski ticket can add $1 or more to the cost of the ticket.

Some ski areas use ski lift access gates to verify ski lift tickets. These gates may use RFID technology to read the ticket at a distance, confirming the validity of the ticket with no skier intervention or they may use magnetic stripe technology requiring the skier to swipe the lift ticket through a magnetic stripe reader. These gates are all permanently fixed in a location. Typically concrete is poured and the gates are anchored in place.

It would be advantageous for ski areas to be able to move the gates to other locations to correspond to skier traffic. On a weekend when skier traffic is heavy, more gates can be added to busy lifts to keep the line moving. During the week when skier traffic is slower, it might make sense to move some of the gates to other parts of the mountain to collect data on the number of skiers using a particular lift. This is not possible with the construction of gates currently used for ski lift access.

Other RFID technologies, such as ultra high frequency (UHF) that provide a lower cost RFID inlay of about 15 cents and have a much longer range of up to 30 ft. have been tried but the results have not been satisfactory. Because of the longer range of UHF RFID, the reader at full power will read every ticket within its field of view. Even at reduced power, the reader has no way of differentiating tickets that are in close proximity, as would be the case if skiers are waiting in a line to access the lifts. Existing UHF RFID technology cannot locate the tickets in 3 dimensional space so the reader has no way of knowing which ticket is at the front of the line versus the ticket slightly behind or those to the side that are not in the lift line at all.

SUMMARY OF THE INVENTION

The invention provides an access control system and method for ski areas or similar facilities which uses a combination of RFID enabled tags and video-image derived biometric information to control access through an access gate.

DETAILED DESCRIPTION OF THE INVENTION

Figure 1:
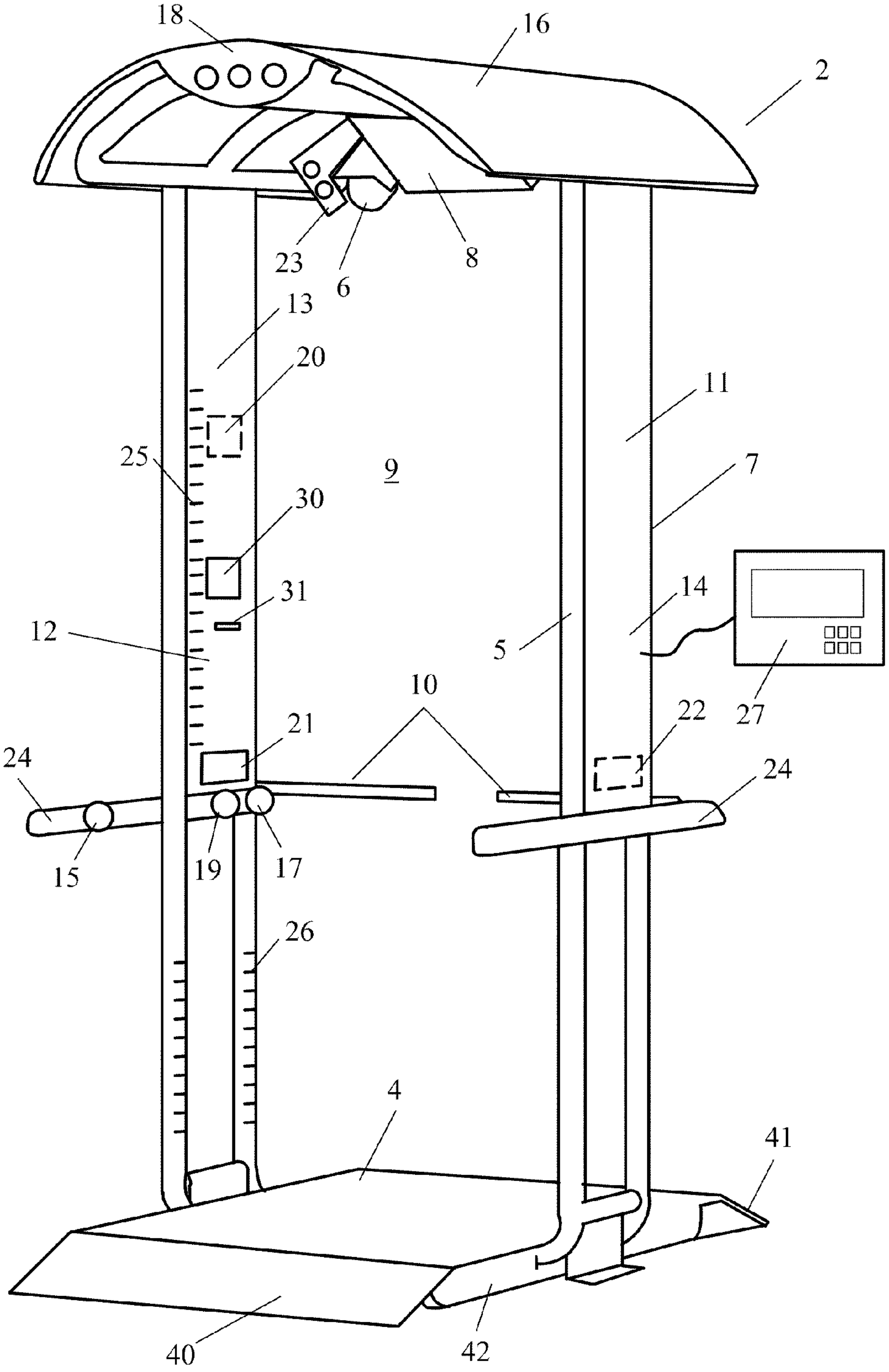
FIG. 1 shows an isometric view of a standalone access gate.

FIGS. 1-8 and 10-11 show access gates for ski lifts which use an ultra high frequency (UHF) radio frequency identification (RFID) reader with tag locating capabilities in 3-dimensional space and biometrics to confirm that the person who first used the ticket is the person present at the access gate to the ski lift.

FIGS. 1-4 show multiple views of a standalone access gate 2. The gate 2 has a base 4 connected to a first wall 12 and a second wall 14. The first wall 12 and second wall 14 each have an outside surface 11, an inside surface 13, an entrance side 5 and an exit side 7. The first wall 12 and second wall 14 are each connected to a roof 16 to define a gate space 9 with an entrance and an exit. Attached to the exit side 7 of the first wall 12 and second wall 14 are access bars 10. The access bars 10 are preferably motorized, so that they can be opened by the access system to allow a skier to pass through, but may also be user-operated with a system-controlled locking mechanism.

The access bars 10 block exit from the access gate 2 until a user or skier with an appropriately tagged pass and biometrics has been determined to be present or scanned for a first time, as described in further detail below.

Handles 24 are attached to outside surfaces 11 of the first wall 12 and the second wall 14 and are present to aid the skier or user moving into the gate space 9 on their skis or snow board. Indicia or markings 25, 26 may be present along the inside surfaces 13 of the first wall 12 and the second wall 14.

Within the first wall 12 is a RFID reader 20, a first antenna 21, and, optionally, a bar-code reader slot 31. While the RFID reader 20 is described as being within the first wall 12, the RFID reader 20 may be present within the second wall 14 instead. Within the second wall 14 is a second antenna 22, opposing the first antenna 21.

Inside the gate space 9 are an exit side sensor 17 at the exit side 7, an entrance side sensor 15 at the entrance side 5, and a middle sensor 19 centered on the boresight of the antennas 21 and 22. The sensors may be on either or both of side walls 12 and 14, or otherwise mounted to cover the entrance, exit and center of the gate space 9. The sensors 15, 17 and 19 are preferably ultrasonic, but may be photoelectric, RF proximity or other kinds known to the art.

Figure 5:
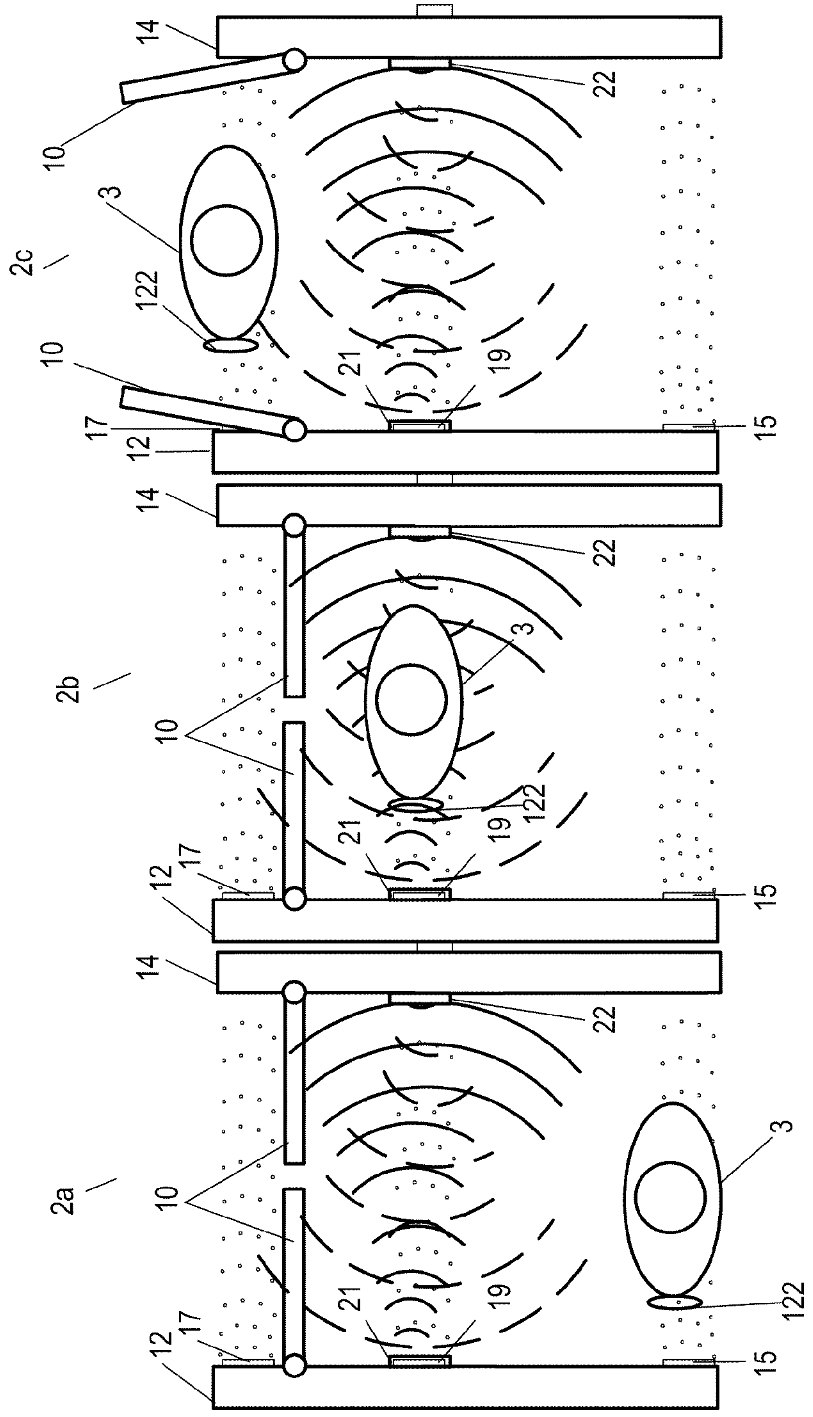
FIG. 5 shows a top view of multiple standalone access gates.

Referring to FIG. 5, a top view of multiple standalone gates 2*a*, 2*b* and 2*c* are shown along with the signals from the sensors 15, 17, 19 and antennae 21, 22 (driven by RFID reader 20). The roofs 16 of the gates and other details have been removed for clarity. As shown, the entrance side sensor 15, middle sensor 19, and exit side sensor 17 send signals (shown in the dotted lines) into the gate space 9 to determine the position of the user 3 as he moves through the gate space 9.

The RFID reader 20 sends an RF interrogation signal from antenna 21 (shown in dashed lines) and also from second antenna 22 (shown in solid lines) into the gate space 9. This causes the RFID tag 122 of the ticket in the user's 3 possession to emit a coded signal, which is received and interpreted by the RFID reader 20. The RF signal is preferably in the UHF spectrum, typically 800 MHz to 1 GHz, although an HF interrogation system could be used. The RFID reader will receive the tag's signal, and may also use the return strength of the signal from the two antennas as described below.

RF shielding is preferably present on each of the gates to prevent the RFID reader from reading tickets of the users in line and not within the gate space 9. The shielding can be in the form of a solid metal panel, such as aluminum, backing the antennas 21 and 22, which aids in containing the signals within each individual standalone gate 2.

The shielding will limit the erroneous reads from tags in other nearby gates, so that a single skier with a valid tag will not cause the gates on either side of the one he's going through to open incorrectly. The system also needs to minimize reads from tags worn by other skiers in line for the same gate, so that a skier without a tag (or with an invalid tag) does not pass through the gate because the skier behind him has a valid tag.

When the ultrasonic sensor 19 has determined that there is a skier in the "boresight" between the antennas 21 and 22, the RFID reader 20 attempts to read the tag 122 worn by the skier. When signals are received by the RFID reader 20, it can compare signals received by the antennas 21 and 22 to confirm that the signal from an RFID tag being read is from a tag in the gates 2, 60. Therefore, the reader 20 can be sure that the tag is for the skier at the front of the line at this particular gate, so that only those skiers that are about to pass through the gate 2, 60 will have their ticket validated.

The comparison can look at the differences in signal strength between signals at the antennas (equal signal strengths indicating a tag centered between the antennas), or at phase differences between the received signals (again, equal phase indicating equal distance), or differences in response delay between the antennas (equal delay indicating equal distance). Also, the tag response delay can be used to determine if the tag is between the antennas (shortest delay) or some distance from the antennas (longer delay).

It will be understood that while two antennas are shown, more than two antennas could be used to further refine the location ability.

Figure 2:
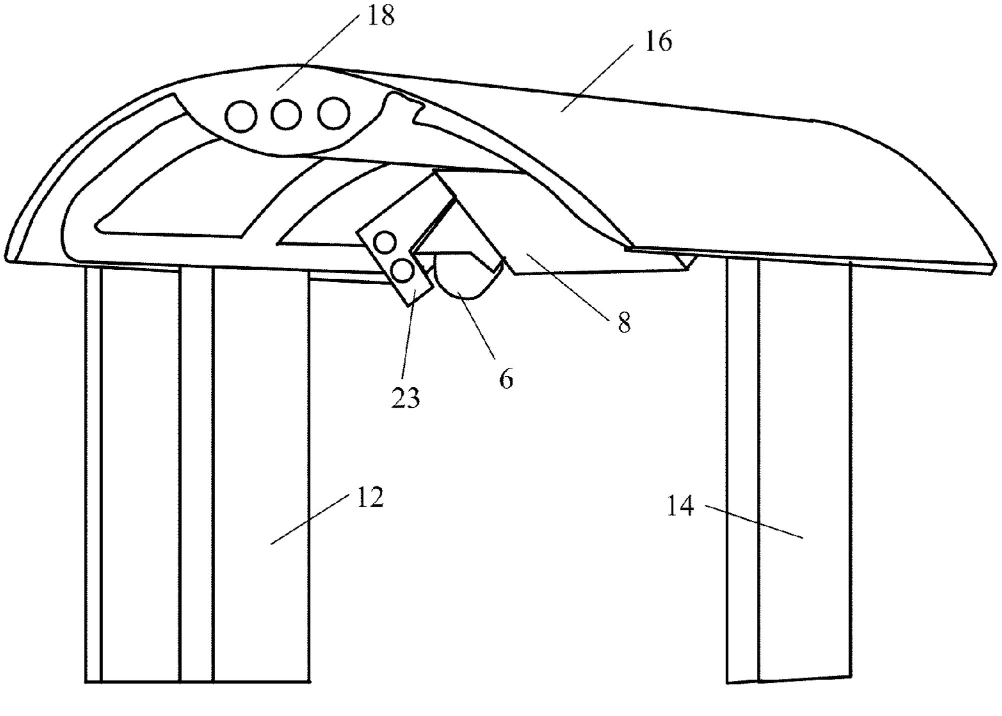
FIG. 2 shows close up of the top portion of the standalone access gate.
Figure 3:
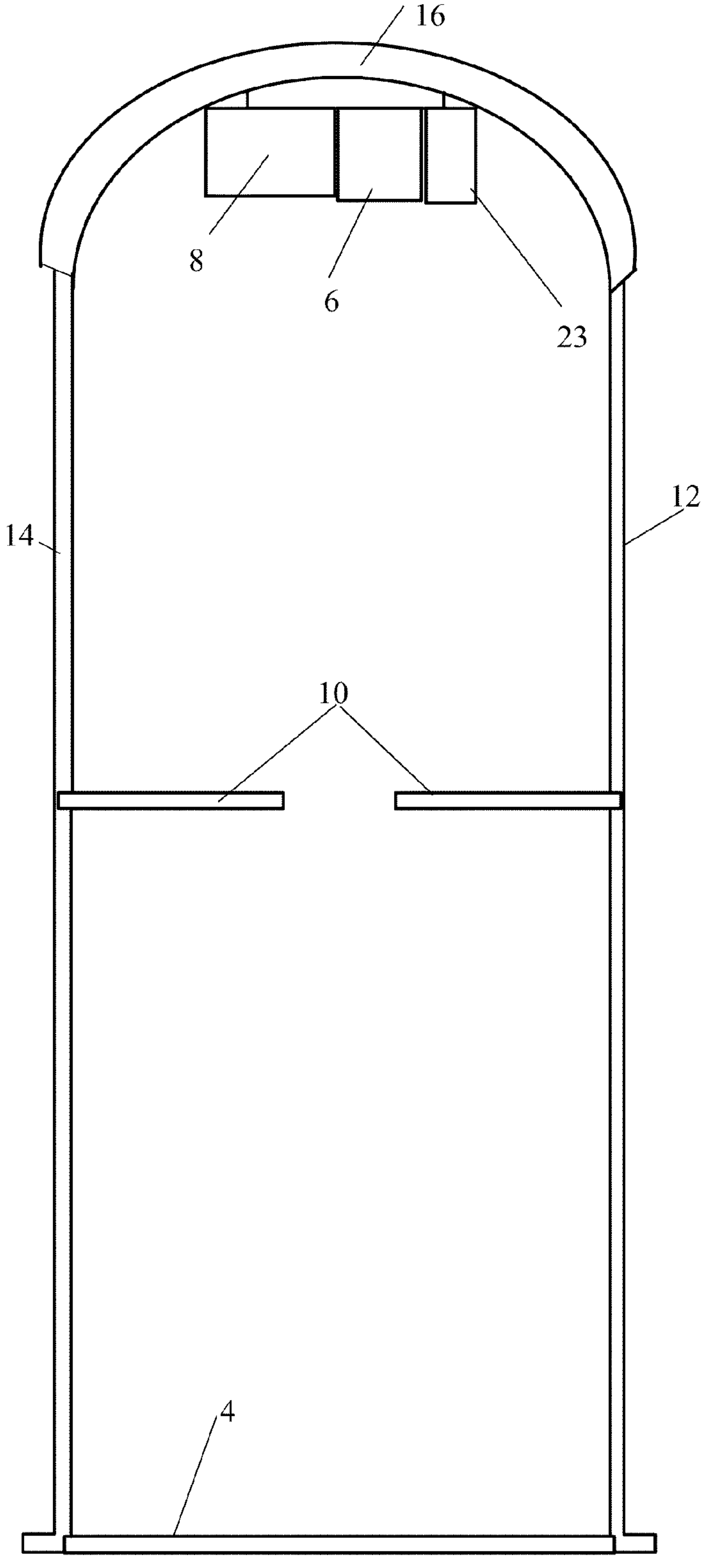
FIG. 3 shows a front view of the standalone access gate.
Figure 4:
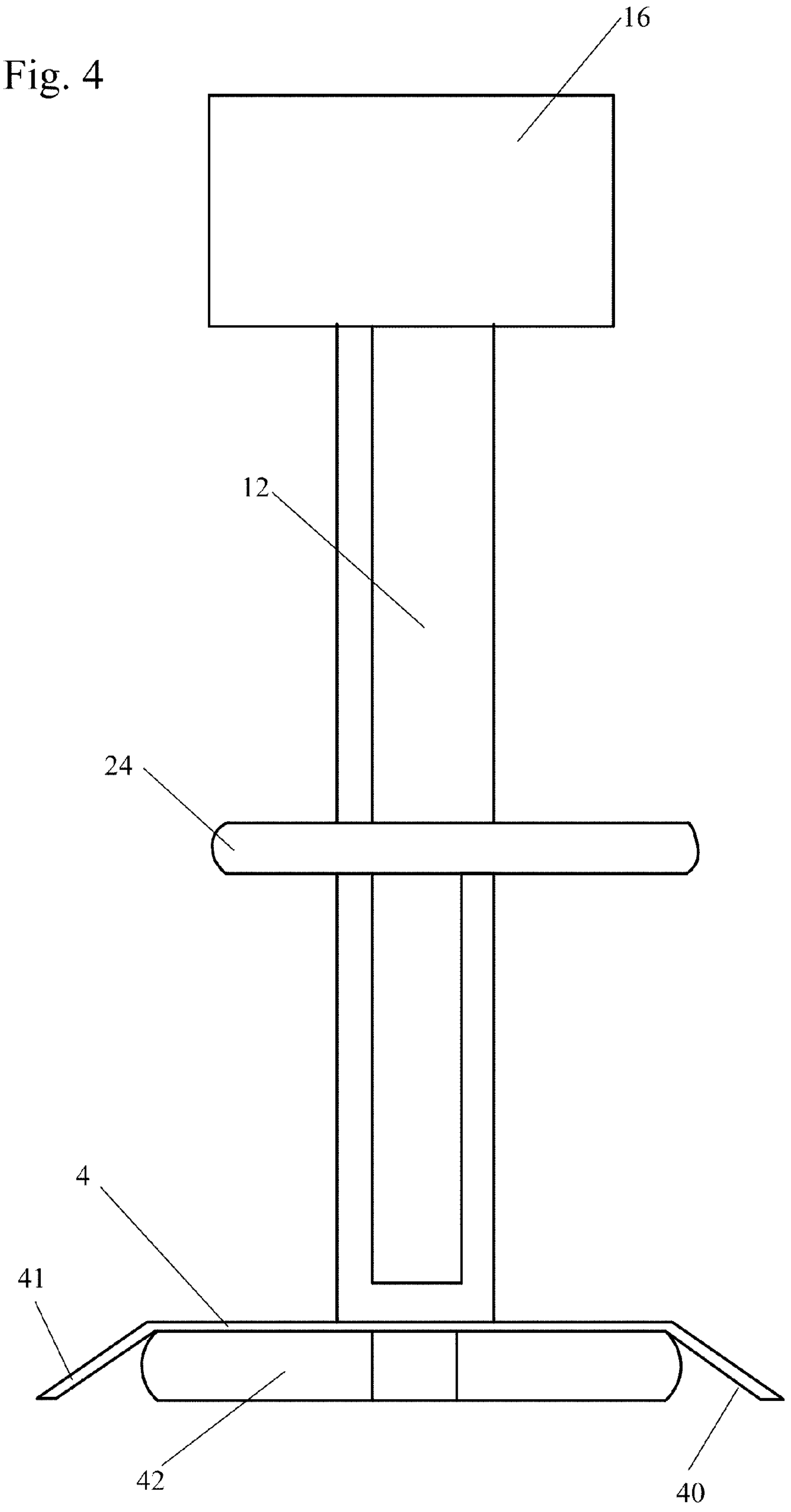
FIG. 4 shows a side view of the standalone access gate.

The system does not depend only on the RFID tag reading. In a preferred embodiment, a range finder 23 and video camera 6, and optionally, status lights 28 and video monitor 8 are mounted underneath the roof 16 of the gate 2, as shown in FIG. 2.

The status bar 18 preferably has a series of lights that indicate the operational status of the gate and whether the ticket is valid, although other means of indicating status may be used. For example, if the light bar had three lights, yellow, green, and red, a yellow solid light would indicate the gate was ready to accept another user, a solid green light would indicate that the ticket is accepted and the gate access bars are opening; green and yellow flashing lights would indicate that a discount ticket was accepted, a red solid light would indicate that the ticket was invalid; and a red flashing light would indicate biometric failure. These color combinations and states of the lights are offered only as an example and other colors and/or states of lights may be used to indicate whatever status is important to specifically designate. Additionally, a voice or audio cue associated with each of the lights and operational status may be present.

The camera 6 underneath the roof 16 of the gate 2 can record an image as the user approaches and enters the gate space 9. The range finder 23 calculates the distance between the user and the gate frame or walls 12, 14. It will be understood that while these elements are preferably under the roof 16 as noted above, the camera 6 and range finder 23 can be mounted elsewhere within the teachings of the invention. Optionally, a video monitor 8 may be mounted under the roof near the camera 6.

Preferably, the image from camera 6 is altered into an outline or silhouette image of the person within the gate space 9. The outline or silhouette image, through the use of software running on a programmed computer processor, allows the extraction of biometric parameters, such as the height, leg length, or location of specific joints of the user as derived from the user's motion as he moves from the area covered by entrance sensor 15 to the boresight covered by middle sensor 19.

A computer processor 30, preferably with a user interface such as a touch screen, is mounted within one of the side walls 12 or 14, and is coupled to the RFID reader 20, sensors 15, 17 and 19, bar-code reader 31 (if so equipped), indicators on the status bar 18, camera 6 and range finder 23. The computer 30 may also be networked with a central processor or site network through wired or wireless means known to the art.

In addition, indicia 25, 26 along the inside surfaces 13 above and below the middle sensor 19 of the first wall 12 and second wall 14 are present to aid in determining absolute height and for determining the depth of snow present within the gate space. For example, indicia or markings 25 above the middle sensor 19 on the inside surfaces 13 of the first wall 12 and second wall 14 may be used to compare to the shoulder joint position derived from an image to get an absolute shoulder height and width. The indicia 26 along the inside surface 13 below the middle sensor 19 may be used to measure the amount of snow in the gate space 9 and subtract the snow from the person's total height as determined by indicia 25.

Figure 14:
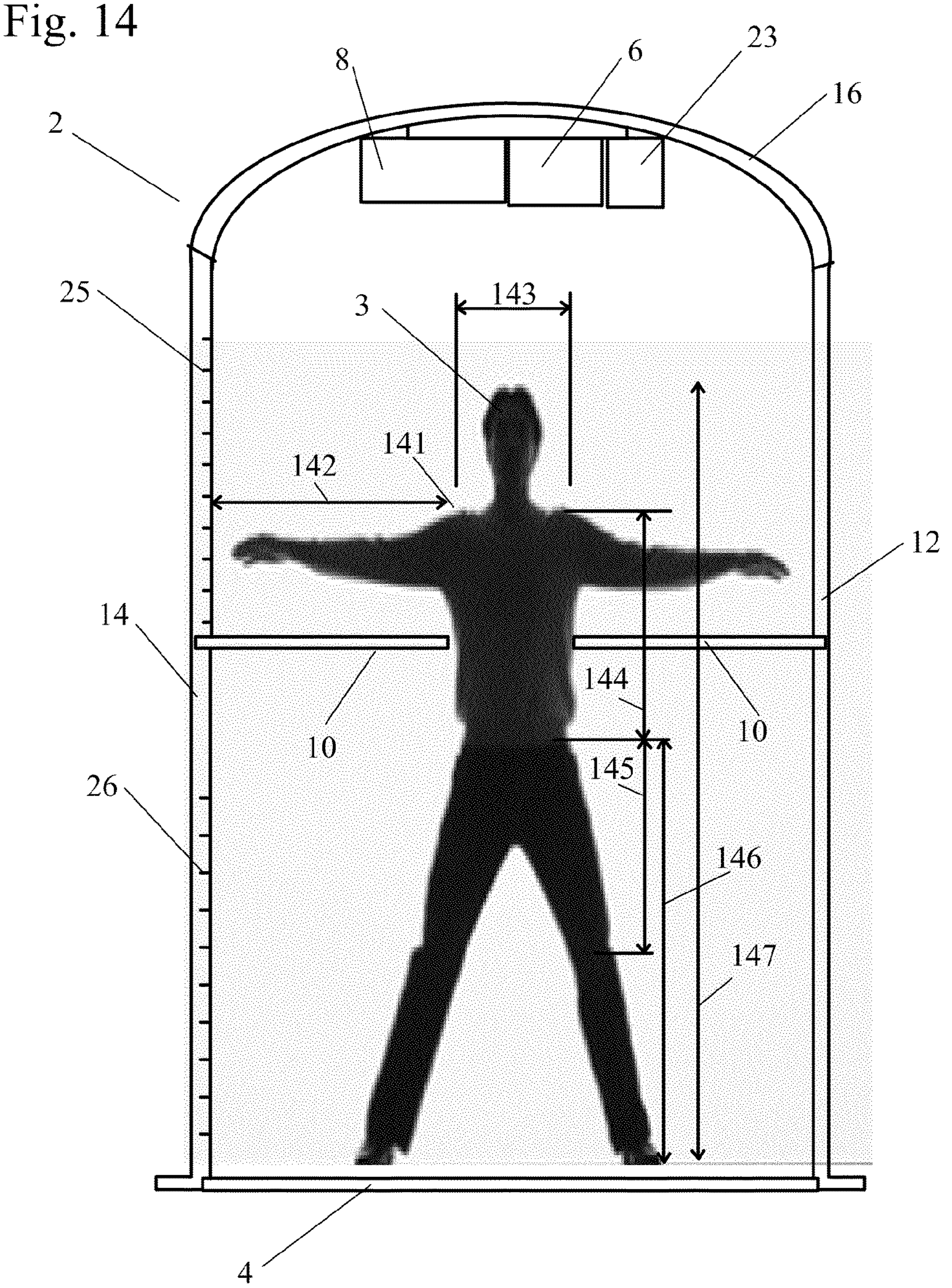
FIG. 14 shows a silhouette or outline image and the biometrics that may be obtained in the access gate.

FIG. 14 shows an example of an outline and the different biometrics that may be measured from the outline or silhouette and from the user's motion from sensor 15 to sensor 19. Current software algorithms can image the motion of a person approaching a video camera and draw a skeleton of the person by differentiating a number of joints within the human body as detected by the motion. Joints such as shoulder to arm, hip to leg, hip to torso, etc. are clearly detectable with this software.

For example, the location 141 of the shoulder joint and the height 142 at which the shoulder joint is relative to the gate markings 25 on the wall section 13. Other biometrics which can be derived and used to help further identify the user are shoulder width 143 joint to joint, torso length 144, femur length 145, and leg length 146.

The method of dress for skiing makes it difficult and cumbersome to use typical biometric data to confirm the identity of the skier. The skier typically has a hat or helmet on, making height measurements 147 to the top of the head unreliable. He may also be wearing ski goggles or a ski mask making facial features difficult to confirm. The goggles also impede the use of retinal scanning, which would also be difficult to do because of different skier heights. Hands are gloved making fingerprint biometrics difficult to use without forcing the skier to remove their gloves, something that most skiers would find objectionable. By using the biometrics that are described by the teachings of the invention, the system can confirm that the user using the lift for the first time continues to be the user that will use the lifts at subsequent times, automatically and undetectably to the user within the gate.

The biometrics that can be derived from this software are considered "soft" biometrics and could not be used to identify an individual person with 100% certainty. However, with these biometrics being used jointly, a number of "soft" biometrics will become a "hard" biometric that can identify an individual with close to 100% certainty.

For ski lift access, a number of "soft" biometrics are used jointly to determine that the user who used a lift ticket the first time is the same person that continues to use the lift ticket during subsequent times. Not requiring 100% correspondence of biometric parameters to an individual would be acceptable because false negatives are much more acceptable than false positives. As an example, the software can determine the location of the shoulder joints on either side of the body. It can use these locations to determine the skier's height relative to these shoulder joints. It can also use the width from shoulder joint to shoulder joint. The software can also add the length from shoulder joint to hip joint and now these three "soft" biometrics will identify an individual with near 100% certainty. Additional biometrics may be extracted from this software to strengthen the biometric identification.

If desired, it is also possible to add voice recognition to the biometrics discussed above. In such a system, the first time that the system is used, the gate display or a digitized voice cue from a speaker system can request that the user speak the name of the ski area, for instance. This can be recorded by a microphone (not shown) coupled to the computer 30, which can then derive and store a voice print from the recording. The voice print is now part of the database, associated with the tag identification. Then, when the ticket ID is verified in later accesses, the system can request that the user repeat the phrase that was used the first time for voice print match.

By verifying that the skier in the gate is authorized to access the slopes, using a combination of biometric information and RFID tag reading, the system will cause access bars 10 to open to let the skier through so that the lift can be accessed. If the ticket is not valid, the access bars 10 and the gate 2, 60 will remain closed.

Figure 12:
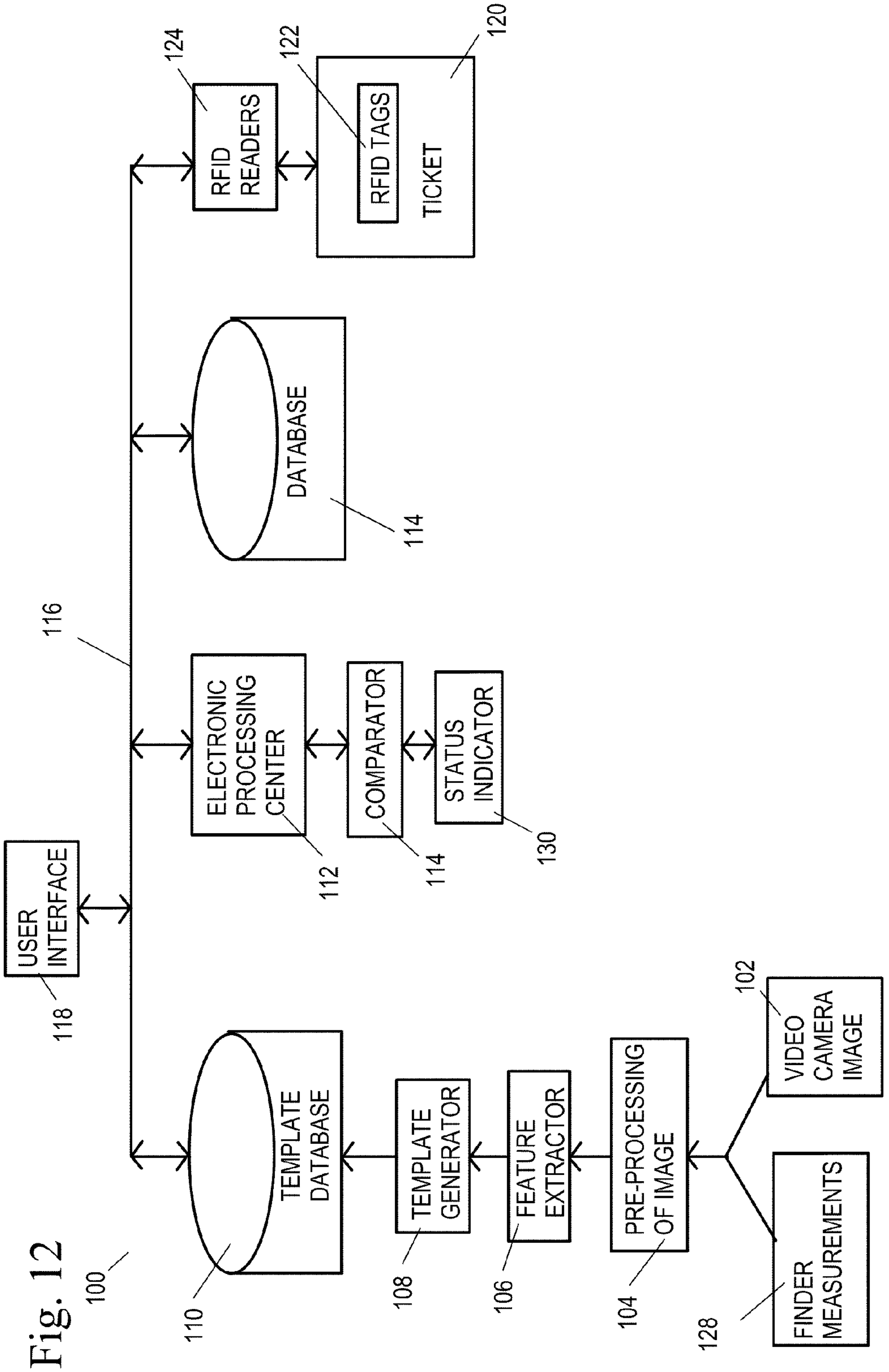
FIG. 12 shows a block diagram of a RFID imaging biometric system for use with the access gates.

FIG. 12 shows a block diagram of the radio frequency identification plus biometrics system 100. Referring to FIG. 12, a ticket 120 with an RFID enabled tag 122 is read by an RFID reader 124. The tag is enabled for RFID by provision of an RFID transponder appropriate for the type of RFID reader being used. Such transponders are commercially available, as, for example, from Alien Technology Corporation of Dayton, Ohio, or UPM Raflatac, Inc., of Dixon, Ill.

The data read off of the tag 122 by the RFID reader 124 is sent via a network 116 to a database 114 containing valid lift ticket ID numbers derived during ticket sales and stored in the database with the indicia or bar code printed on the ticket and the RFID data stored in the tag 122. As the skier enters the gate, an image 102 is taken by a camera or video camera and is preferably sent via a network to pre-processing 104 to change the image into a silhouette image in a computer processor using software known to the art. This processing is made easier by the provision of the gate roof, which can throw the user into shadow, against the brighter snow behind.

The silhouette image is then sent via a network 116 to a feature extractor 106. A template generator 108 generates measurements of specific joints and other biometrics to create a template of the user based on biometrics. The template is sent via a network 116 to a template database 110 to be stored. Additionally, measurements from a range finder 128 may also be sent to the feature extractor 106 to be paired with the silhouette image.

The template database is networked with the database 114 containing the lift ticket ID number derived from the RFID enabled tag 122 on the tickets 120. An electronic processing center 114 pairs the template of the user and the RFID enabled tag 122 read from a first read and can compare the template of the user and the RFID enabled tag 122 read to a second template of the user generated for any subsequent reads. The electronic processing center 112 is paired to a status indicator 130 as well as a user interface 118.

Figure 13:
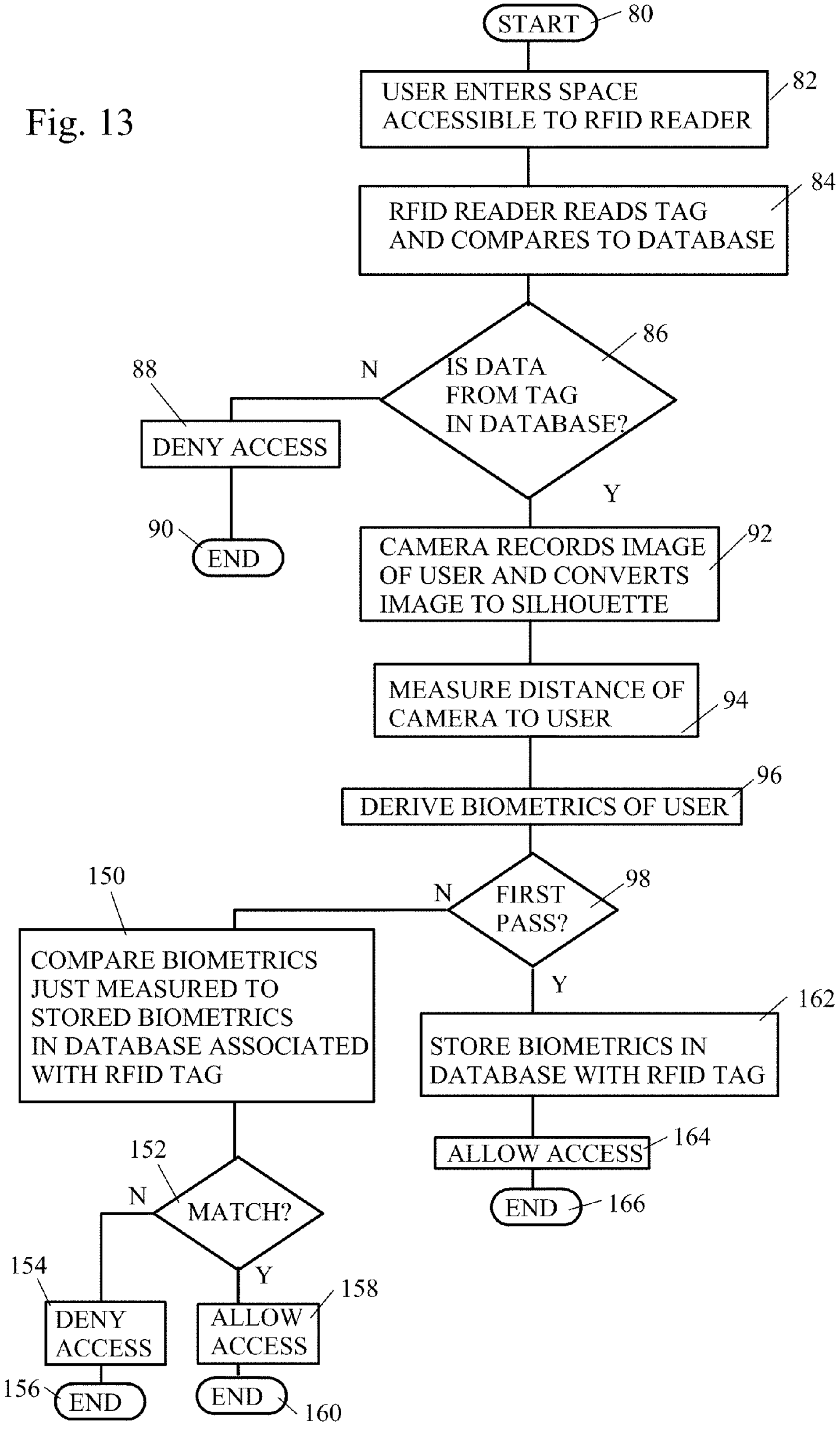
FIG. 13 shows a block diagram of how the access gates are used with the RFID imaging biometric system.

FIG. 13 shows a block diagram of how the access gates are used with the RFID imaging biometric system. The method starts at (step 80).

A user 3 enters a space accessible to an RFID reader 20 (step 82). Then the RFID reader 20 reads an RFID enabled tag 122 and compares the data from the tag to the database (step 84).

If desired, the tag may also be printed with a bar code, or some tags might be used at a given ski area which do not have RFID inlays—for example, temporary or short-term tags, or tags created by other parties which are nonetheless valid at the ski area. For such tags, a bar code reader 31 (FIG. 1) can be embedded in the system at the gate to read the bar codes, which can then substitute in the method for the RFID information. It will be understood in the description following that the data from the RFID enabled tag includes any such bar code information.

If the data from the RFID enabled tag is in the database as not being purchased, or is not valid at the time the tag is read, or has expired, or is not present in the database at all, (step 86), then access through the gate is denied (step 88) and the method ends (step 90).

If the data from the RFID enabled tag 122 matches an entry in the database which indicates that the tag has been purchased and is currently valid (step 86), then a camera records an image of the user 3 with the tag 122 and converts the image to a silhouette (step 92). A range finder can also measure the distance of the camera to the user (step 94), to aid in determining absolute dimensions from the image. Biometrics of the user from the silhouette are derived (step 96), for example, the biometrics of the skier's height relative to the shoulder joints and relative to the indicia 25 on the wall 12, the width from shoulder joint to shoulder joint of the skier, torso length, femur length, leg length and height as determined by adding the length from shoulder joint to hip joint or by subtracting the distance from the top of the gate to the shoulders and from the top of the gate to the bottom of the boots.

If this is the first pass (step 98) of the user through the access gate (i.e. the first time the tag has been read) and no biometrics exist in the database as yet, the biometrics or template derived in step 96 are stored in a database and associated with the RFID tag (step 162). Then the user is allowed access through the gate (step 164) and the method ends (step 166).

If this is not the first pass (step 98) of the user through the access gate, compare the biometrics just measured to stored biometrics or templates associated with the RFID tag (step 150). If the biometrics just measured match the template stored (step 152), allow access through the gate (step 158) and the method ends (step 160). If the biometrics just measured do not match the template stored (step 152), deny access through the gate (step 154) and the method ends (step 156).

It will be understood that where the method describes a "match" in biometrics, the system parameters can be set to vary the range of acceptable mis-matches in this information. If there is a near match of several biometrics, depending on system parameters, the system can declare a biometric match and allow the individual to use a particular ski lift. If a number of measured biometrics do not match with what is in the database then a biometric failure will be declared and access can be denied.

In another embodiment of the invention, skier boot size and skier height may be used as biometrics for verifying that the ticket was not transferred. The first time that the ticket RFID tag is read by the RFID reader, a range finder and video camera in the base of the gate will take a digital image of the ski boot of the skier. The range finder will calibrate the distance away from the gate frame that the image of the boot was taken. Using imaging techniques, the boot size will be determined.

The gate can also have a range finder and video camera in the roof that will capture the location of where the skier's shoulder meets the arm. Using digital imaging techniques, the gate will compute the distance from the top of the gate to the shoulder and arm interface and to the bottom of the boot. This calculation will determine the approximate height of the skier. With the boot size and height of the skier determined during first use and stored in the system data base, each time the tag ID is read, these two biometrics will be measured and compared to first use. If these do not match in subsequent use, the gate will deny access to the lift.

As discussed above, voice recognition can also be used as a biometric to further strengthen the access control system.

The method of the invention allows recording of statistics about the usage of a given RFID enabled tag, or of the user who purchased or used the tag, for whatever purposes the ski area owner might wish. For example, if the access gates are installed at all of the lifts in a ski area, the system can record each time a user passes through a gate associated with a particular lift to accumulate statistics on the total vertical height the user has skied or snowboarded in a season. This could be used for loyalty reward programs, and reported to the user as an incentive to use the area more. Targeted advertising on a video monitor at or near the gates could be provided for a user based on his or her previous usage or other information.

Access to particular lifts or other features of an area could also be controlled by use of the databases in the system—for example, if an RFID tag were issued to a beginner, the system could be programmed to deny access or issue a warning if the user tried to board a lift for a particularly challenging slope.

The system could also be programmed to recognize and record use by other RFID tags as an additional feature. For example, RFID tags could be put in rental skis and other equipment, and the use of the equipment could be tracked along with information on the RFID enabled tag identifying the user.

A video monitor 8 may additionally be present underneath the roof to display snow conditions, length of lift lines on other mountains, advertisements, or other announcements.

A user interface 27 for users operating the gate 2, such as ski area employees, may be present at the gate 2 or at a separate location.

Figure 6:
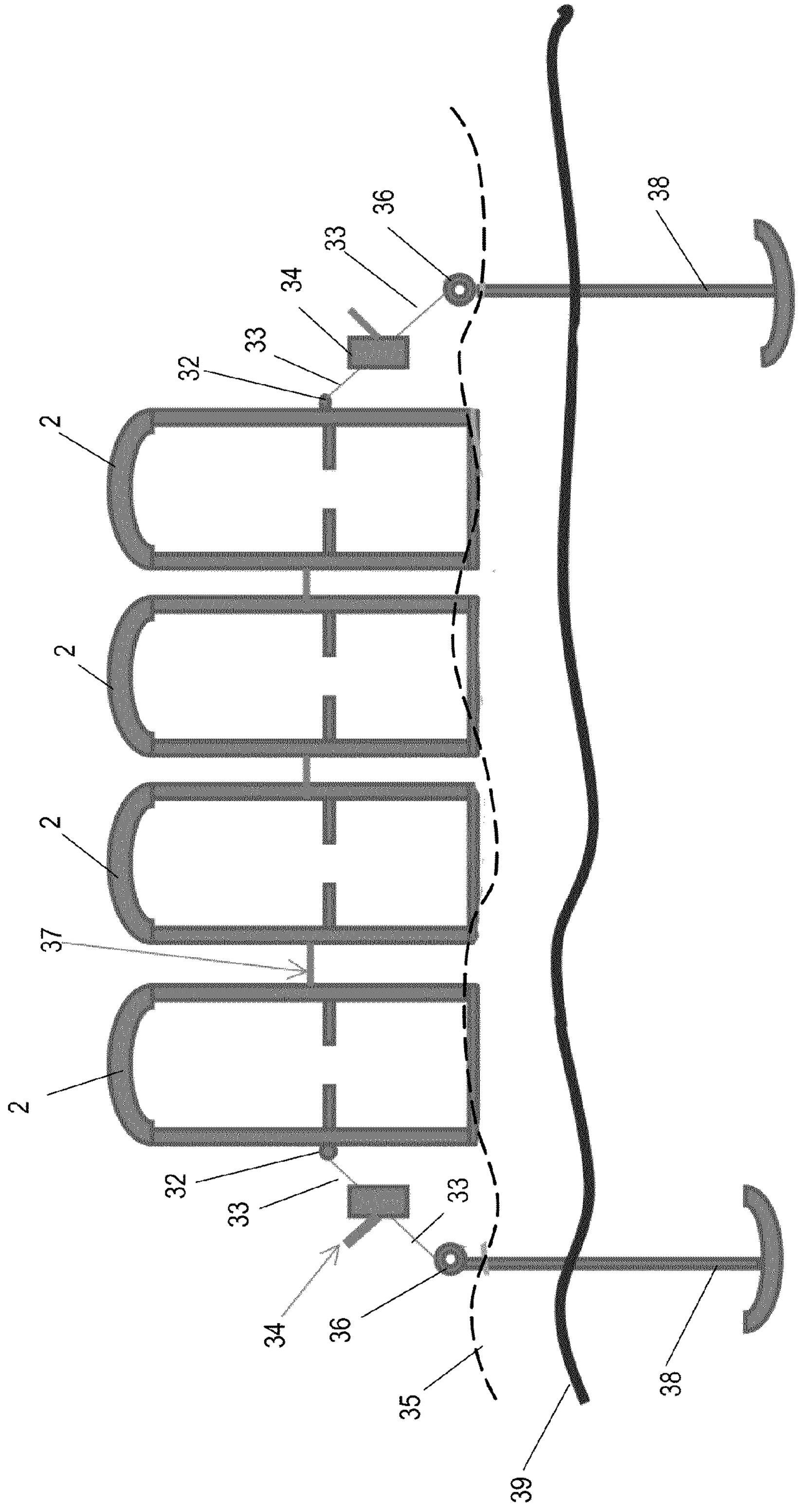
FIG. 6 shows a schematic of freestanding anchoring of multiple standalone access gates.

The standalone access gate 2 may be anchored in place in numerous ways. FIG. 6 shows an embodiment in which a series of standalone access gates 2 are interconnected to each other by an interconnection piece 37 and the two end standalone access gates of the series are anchored to the ground. A winch cable 33 with hooks, for example snap hooks, on one end is connected to anchors 32 on the gate. The opposite end of the cable 33 is attached to a cable winch release 34. Another winch cable 33 has an end attached to the cable winch release 34 and an opposite end with a hook, for example a snap hook, for releasably attaching to a guy 36 above the ground (indicated by the solid line in FIG. 6). The guy 36 is attached to a guy anchor 38 with an end beneath ground level 39. The guy 36 is preferably high enough above ground level 39 to be above the snow level 35 (indicated in FIG. 6 by the dashed line).

In another embodiment, the standalone gate 2 has a collapsible feature and is easily movable so that the gate 2 may be placed at any location and at any lift on the mountain.

Figure 7:
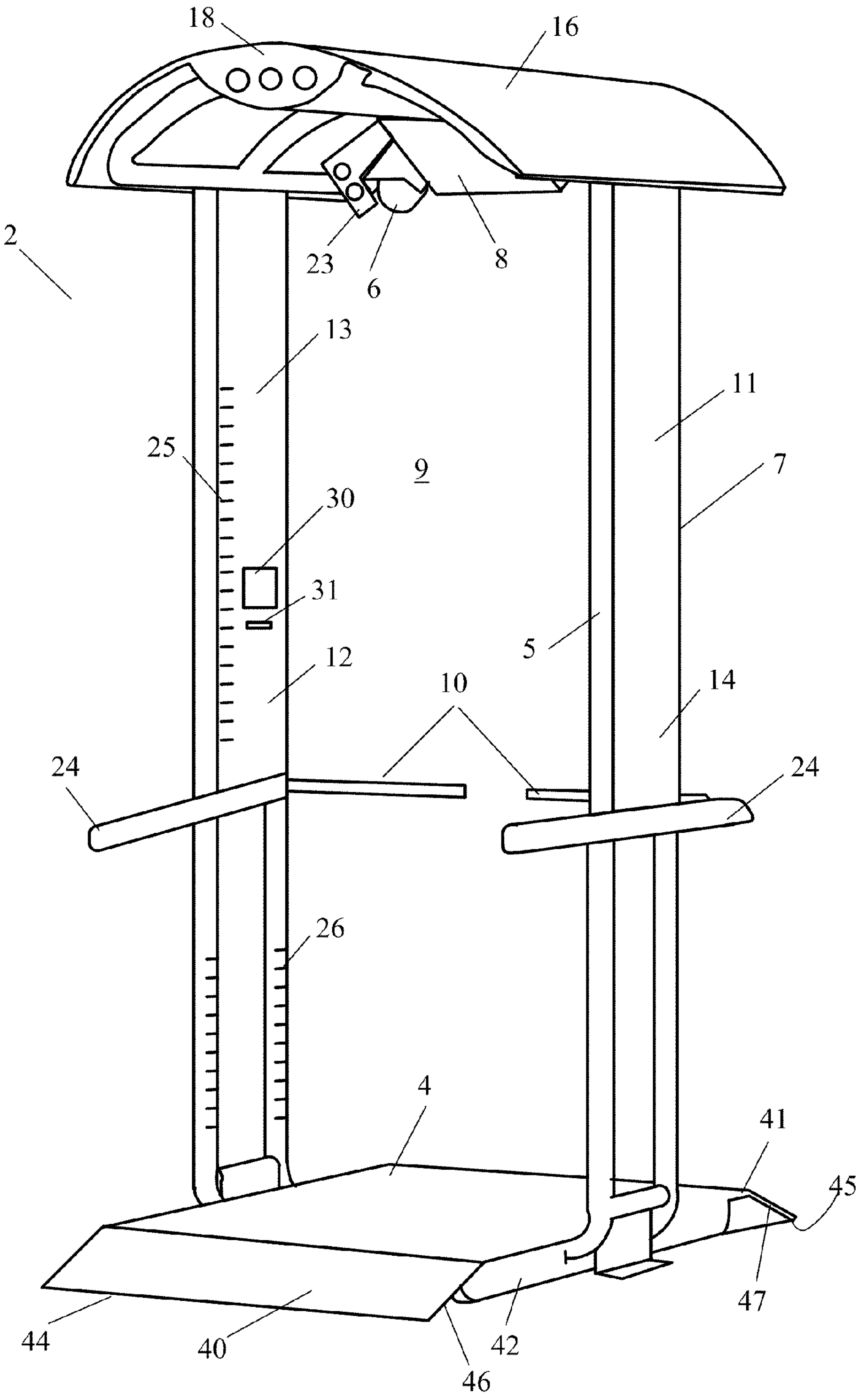
FIG. 7 shows an isometric view of a mobile standalone access gate of an alternate embodiment in an anchored position.
Figure 8:
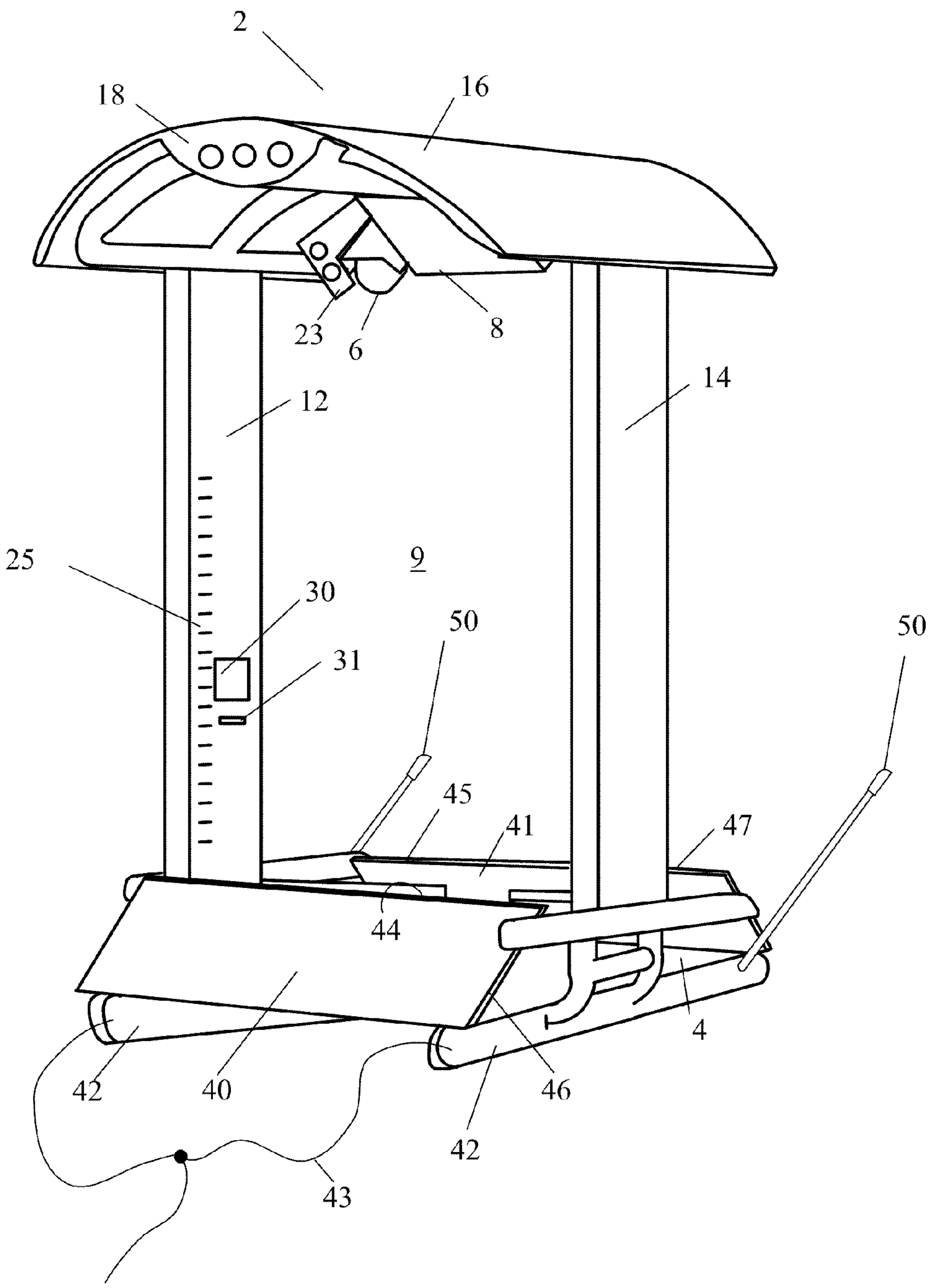
FIG. 8 shows an isometric view of a mobile standalone access gate in a mobile position.

The gate 2 would be able to be moved by a vehicle such as a snowmobile, a ski lift, or manual pushing and pulling. In this embodiment, the base 4 has an entrance ramp 40 and an exit ramp 41 which are on hinges and are moveable from a first position in which an edge 44, 45 of the entrance ramp 40 and the exit ramp 41 are in contact with the ground or snow as shown in FIG. 7, to a second position in which the edges 44, 45 of the entrance ramp 40 and the exit ramps 41 are moved toward each other and towards the center of the gate space 9 and are essentially folded up as shown in FIG. 8. Also, the height of the side walls 12 and 14 can be adjusted from a full-height operating position shown in FIG. 7 down to a collapsed position for transportation as shown in FIG. 8.

The handles 50 are pulled out from the underside of the tread plate and are attached to a side edge 46 of the entrance ramp 40 and a second end of each of the handles 50 are attached to the side edge 47 of the exit ramp 41. The handles allow for manual movement via pushing, pulling, or skiing in front of the system like a toboggan for transporting injured skiers. The ramps are held in place by spring tension.

When the entrance ramp 40 and the exit ramp 41 are in the first position, as shown in FIG. 7, the entrance ramp 40 and exit ramp 41 act as ski brakes and aid in anchoring the gate 2 in place. When the entrance ramp 40 and exit ramps 41 are in the second position, as shown in FIG. 8, base legs 42, similar to skis, are exposed and with the ramps up 40, 41, the gate 2 may slide on the base legs 42. Cables 43 may be attached to the gate 2, preferably to the base legs 42.

Figure 9:
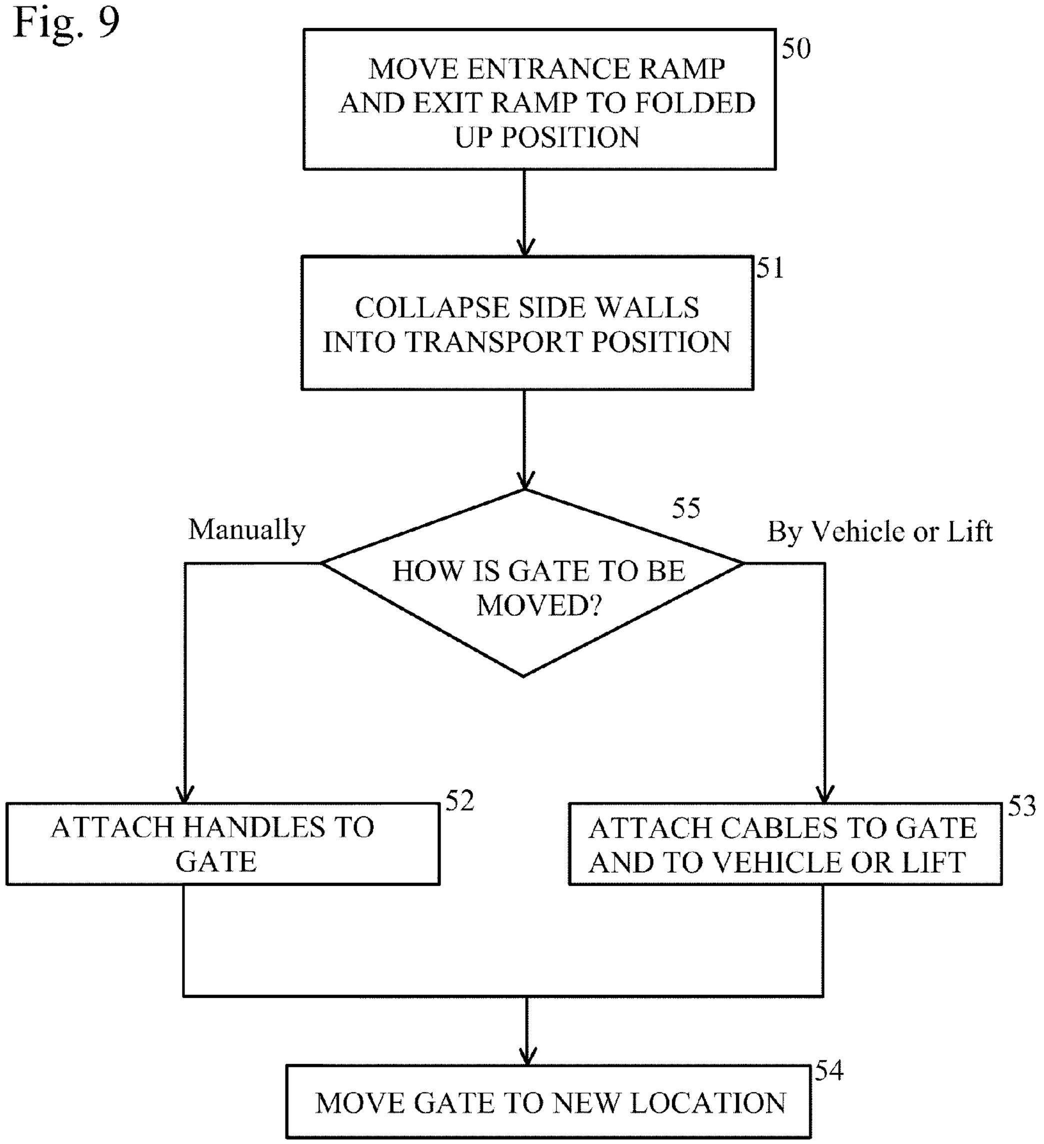
FIG. 9 shows a block diagram with the steps of preparing the gate for mobile position and moving the gate.

The steps for preparing and moving a standalone gate are shown in FIG. 9. In a first step, the entrance and exit ramps 40, 41 are moved to a folded up second position (step 50), and the side walls are collapsed to a transport position (step 51).

The next step depends on how the gate is to be moved (step 55). If the standalone gate is to be moved manually, the handles 50 are pulled from the underside of the tread plate 4, then attached to side edges of ski-like structures 42 (step 52), although other modes of attachment may also be used. If the standalone gate is to be moved via snowmobile or other vehicle, or pulled by a lift, cables 43 are attached to the gate 2 (step 53).

Once the handles or cables are attached, the gate 2 is moved to new position by the vehicle or lift (step 54).

Figure 10:
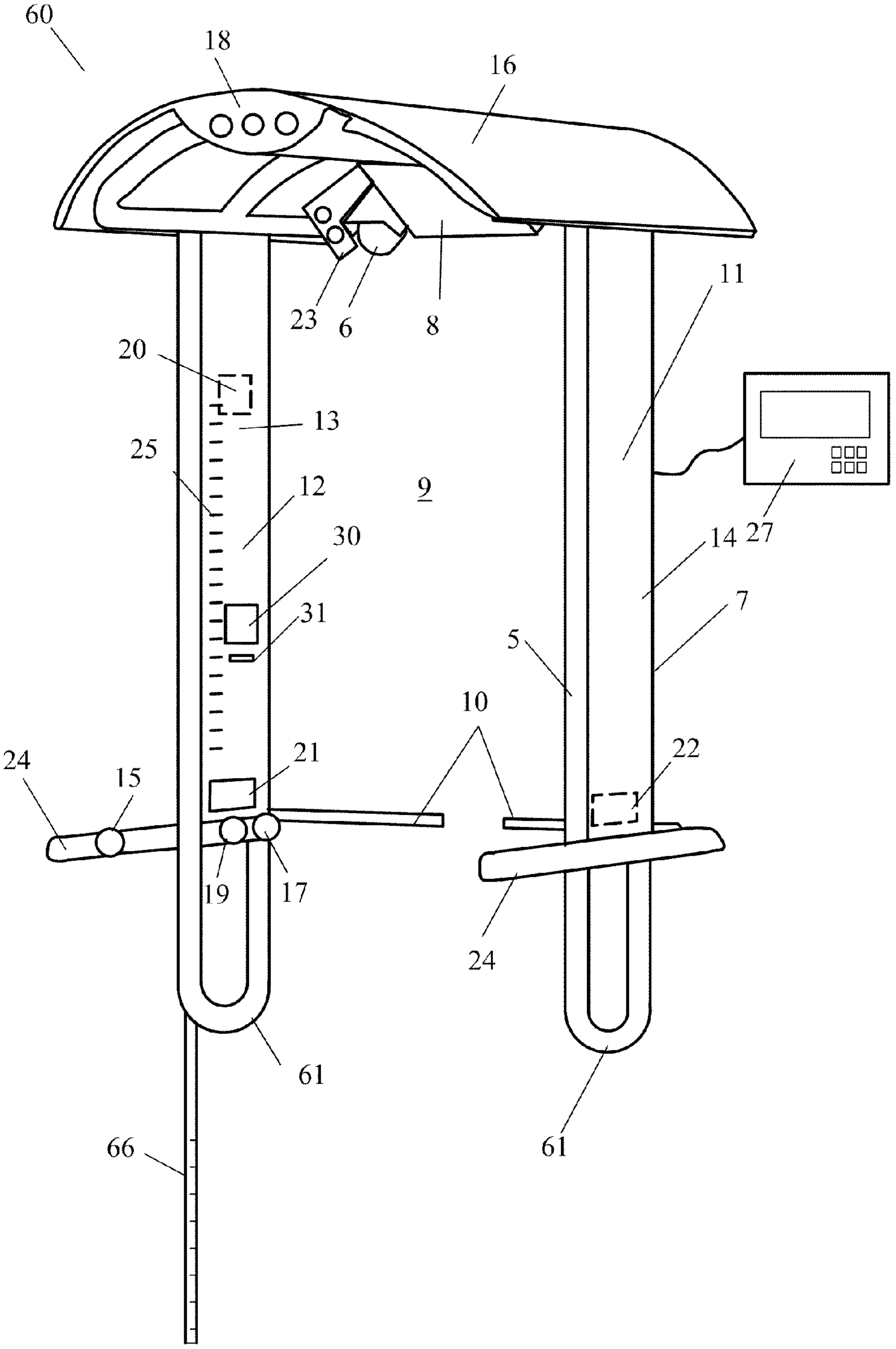
FIG. 10 shows an isometric view of an individual access gate that may be gantry mounted.
Figure 11:
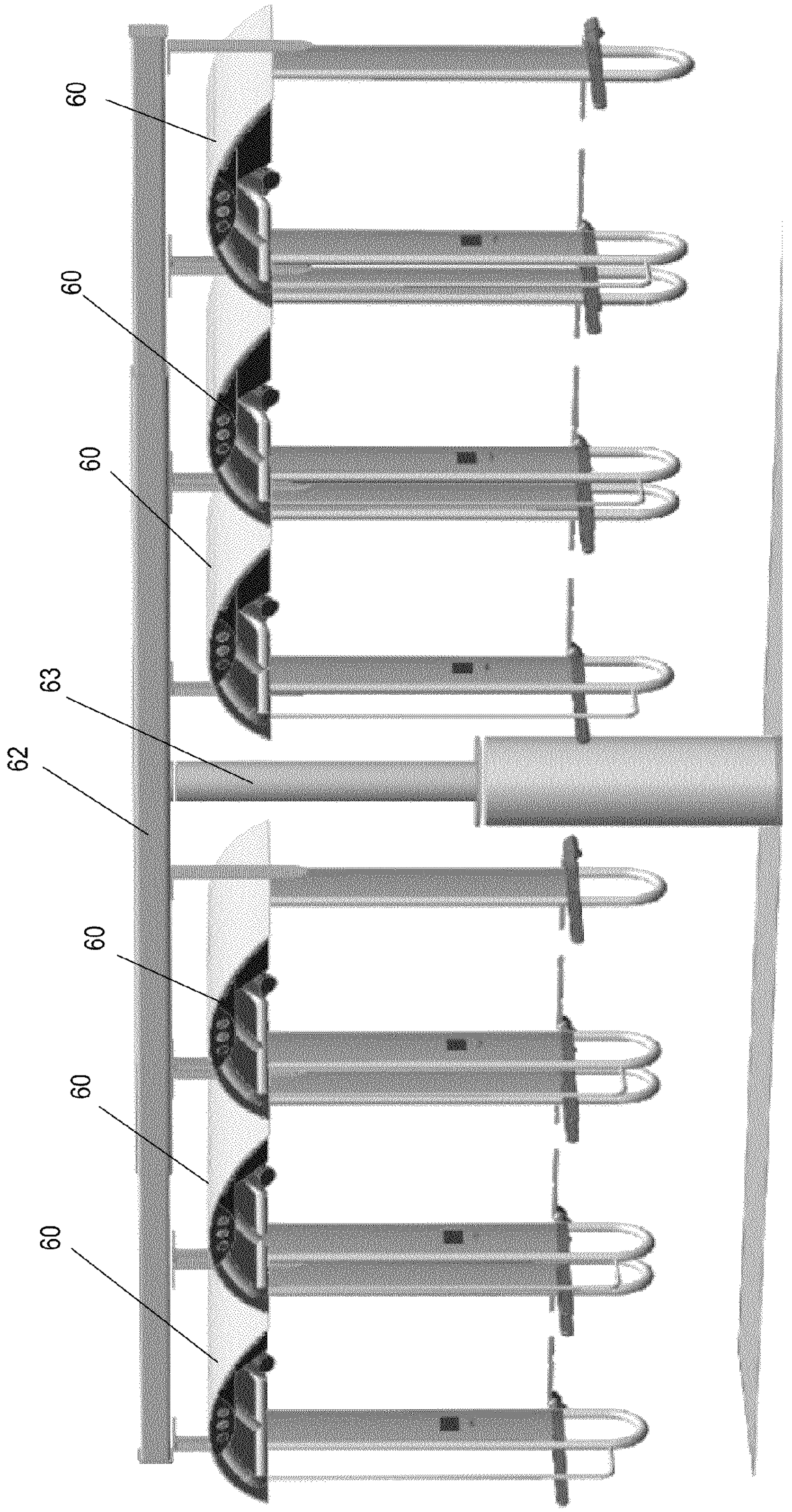
FIG. 11 shows a plurality of access gates, gantry mounted.

FIGS. 10 and 11 show an embodiment of a gate 60 that may be permanently gantry mounted. The gate 60 has a similar configuration as the standalone gates 2 shown in FIGS. 1-5.

As shown in FIG. 11, multiple gates 60 may be mounted to a gantry 63. The gantry 63 is rotatable about a central shaft 62 to allow for snow grooming.

The difference between the gate 60 shown in FIGS. 10 and 11 and the standalone gate 2 shown in FIGS. 1-4 is that a portion of the first side wall and the second side wall below the retractable handles is replaced with a U-shaped tube 61. A vertical pole 66 at the bottom of the U shape tube may be marked with indicia for use in measuring a depth of snow, and is preferably retractable during rotation of the gantry around the center post 63.

Having the pole 66 with indicia for measuring snow depth is desirable since in this embodiment the skier is on a snow surface rather than a base or platform. Because the distance between the skis and the ground will vary with snow depth, just knowing a skier's location relative to the side walls is not sufficient to determine the skier's shoulder height. It is necessary to subtract the snow height from the measured height relative to the side walls to determine true height. The imaging system will also be able to estimate the distance from the bottom of the U shape to the snow surface and derive an approximation of the snow depth instead of using the vertical section of the U-shaped piece.

Another aspect of this invention is a gang connection for feeding AC power from unit to unit. The unit interconnect provides physical stability while at the same time daisy chaining AC power. Because each unit contains an RFID reader and operates in a wireless mode, just AC power needs to be daisy chained.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An access gate comprising:

a base;

a first wall and a second wall attached to the base, each wall having an inside surface, an outside surface, a height, an entrance side and an exit side;

a gate space defined by the inside surface of the first wall and the second wall and the base;

an entrance side sensor mounted at the entrance side of the first wall and the second wall for sensing entrance of a user into the gate space;

a middle sensor mounted on an inside surface of at least one of the first wall and the second wall for sensing a user centered within the gate space;

at least one access bar mounted to the exit side of the first wall and the second wall, the at least one access bar being moveable between an open position, allowing exit from the gate space, to a closed position in which exit from the gate space is denied;

a UHF radio frequency identification reader having at least two antennas within the gate space, for reading UHF RFID enabled tags within the gate space and determining that a UHF RFID enabled tag is in within the gate space by comparing signal strengths from the at least two antennas;

a motion video camera for capturing moving images of the gate space; and a computer coupled to the UHF radio frequency identification reader, the motion video camera, the entrance side sensor, the middle sensor and the at least one access bar;

such that when a user enters the gate space and is sensed by the entrance side sensor the motion video camera captures moving images of the user until the middle sensor senses the user centered in the gate space, the computer derives biometrics from the captured moving image, the UHF radio frequency identification reader reads an identification from a UHF RFID enabled tag within the gate space carried by the user, and the computer permits the access bar to be movable to the open position at least if the identification is valid for access.

2. The gate of claim 1, further comprising an entrance ramp with an outer edge attached to a first side of the base and an exit ramp with an outer edge attached to a second side of the base, the entrance ramp and exit ramp each moveable between a first position and a second position.

3. The gate of claim 2, wherein in the first position, the outer edge of the entrance ramp and the outer edge of the exit ramp are in contact with a ground surface.

4. The gate of claim 2, wherein in the second position, the outer edge of the entrance ramp and the outer edge of the exit ramp are rotated inwards towards a center of the gate space, exposing gate legs, wherein when the gate legs are exposed, the gate is slidable on a ground surface.

5. The gate of claim 1, further comprising indicia on the inside surface of at least the first wall or the second wall for determining a height relative to the indicia.

6. The gate of claim 1, further comprising handles removeably attached to the gate.

7. The gate of claim 1, further comprising:

an exit side sensor mounted at the exit side of the first wall and the second wall for sensing exit from the gate space.

8. The gate of claim 1, further comprising a roof connected to the first wall and the second wall.

9. The gate of claim 8, further comprising a range finder mounted adjacent the video camera underneath the roof.

10. The gate of claim 1, wherein the first wall and the second wall further comprise radio frequency shielding.

11. The gate of claim 1, wherein the gate is connectable to another access gate through an interconnection piece.

12. The gate of claim 1, in which the computer also bases permission for the access gate to move to the open position based upon correspondence between the biometrics and stored biometrics associated with the user's UHF RFID enabled tag.

13. The gate of claim 1, in which the height of the first wall and the second wall can be adjusted from a folded position for transportation to a full-height position for use.

14. The gate of claim 1, further comprising a barcode reader.

15. An access gate comprising:

a first wall and a second wall each attached to a U-shaped tube, each wall having an inside surface, an outside surface, an entrance side and an exit side;

a gate space defined by the inside surface of the first wall and the second wall;

an entrance side sensor mounted at the entrance side of the first wall and the second wall for sensing entrance of a user into the gate space;

a middle sensor mounted on an inside surface of at least one of the first wall and the second wall for sensing a user centered within the gate space;

at least one access bar mounted to the exit side of the first wall and the second wall, the at least one access bar being moveable between an open position, allowing exit from the gate space, to a closed position in which exit from the gate space is denied;

a UHF radio frequency identification reader having at least two antennas within the gate space, for reading UHF RFID enabled tags within the gate space and determining that a UHF RFID enabled tag is in within the gate space by comparing signal strengths from the at least two antennas;

a motion video camera for capturing moving images of the gate space; and a computer coupled to the UHF radio frequency identification reader, the motion video camera, the entrance side sensor, the middle sensor and the at least one access bar;

such that when a user enters the gate space and is sensed by the entrance side sensor the motion video camera captures moving images of the user until the middle sensor senses the user centered in the gate space, the computer derives biometrics from the captured moving image, the UHF radio frequency identification reader reads an identification from a UHF RFID enabled tag within the gate space carried by the user, and the computer permits the access bar to be movable to the open position at least if the identification is valid for access.

16. The gate of claim 15, further comprising indicia on the inside surface of at least the first wall or the second wall for determining a height relative to the indicia.

17. The gate of claim 15, further comprising:

an exit side sensor mounted at the exit side of at least one of the first wall and the second wall for sensing exit from the gate space.

18. The gate of claim 15, further comprising a roof connected to the first wall and the second wall.

19. The gate of claim 18, further comprising a range finder mounted adjacent the video camera underneath the roof.

20. The gate of claim 15, wherein the first wall and the second wall further comprise radio frequency shielding.

21. The gate of claim 15, in which the computer also bases permission for the access gate to move to the open position based upon correspondence between the biometrics and stored biometrics associated with the user's UHF RFID enabled tag.

22. The gate of claim 15, further comprising a barcode reader.

23. The gate of claim 15, wherein the gate is mounted to a gantry.

24. The gate of claim 23, wherein the gantry is rotatable about a central shaft.

25. The gate of claim 15, further comprising a vertical pole having indicia for measuring snow depth, attached to the U-shaped tube and extending downward therefrom.

26. A method of controlling access to an area using an access gate enclosing a gate space, the access gate having an entrance side sensor mounted at the entrance side of the gate space, a middle sensor mounted at a location for sensing a user centered within the gate space, at least one access door movable from a closed position to an open position, a UHF radio frequency identification reader for reading UHF RFID enabled tags, a motion video camera for capturing moving images of the gate space, and a computer coupled to the access door, the entrance side sensor, the middle sensor, the UHF radio frequency identification reader and the motion video camera, the method comprising:

a) when the entrance side sensor senses the presence of a user entering the gate space, the motion video camera beginning to capture a moving image of the user entering the gate space;

b) when the middle sensor senses the presence of the user centered within the gate space, the motion video camera stopping capturing the moving image and the UHF radio frequency identification reader reading an identification from a UHF RFID enabled tag in the gate space;

c) the computer comparing the identification from the RFID enabled tag to a first database;

d) if the identification from the RFID enabled tag matches identification data present in the first database, the computer determining from data in the first database that the RFID enabled tag is valid for access, then:

i) if the RFID enabled tag is valid for access, the computer deriving a plurality of biometrics of the user from the moving image captured by the motion video camera by:

altering the moving image into a moving outline or silhouette image of the user within the gate space;

deriving information about a skeleton of the user by differentiating a plurality of joints within the user's body from the moving outline or silhouette image; and extracting a plurality of biometrics from the information about the user's skeleton derived from the moving outline or silhouette image;

ii) the computer determining if biometrics is present in a second database associated with the RFID enabled tag;

iii) if there is no biometrics present in the second database, indicating that the RFID enabled tag has not previously entered an access gate, then:

A) the computer storing the biometrics derived in step (ii) in the second database, associated with the identification of the UHF RFID enabled tag;

B) the computer allowing the user to exit through the access gate by allowing the at least one access door to move to the open position;

iv) if biometrics are present in the second database associated with the RFID enabled tag, indicating that the RFID enabled tag has previously entered an access gate, then:

A) the computer comparing the biometrics derived in step (ii) to biometrics stored in the second database;

B) if the comparison of step (iv)(A) indicates that the biometrics derived in step (ii) match the biometrics stored in the second database, the computer allowing the user to exit through the access gate by allowing the at least one access door to move to the open position.

27. The method of claim 26, in which the access gate further comprises a rangefinder for determining a distance between the camera and the user, and the deriving biometrics of step (d)(i) further comprises using the distance between the camera and the user to determine biometrics comprising a plurality of dimensions of parts of the user's body.

28. The method of claim 26, in which the biometrics extracted from the information about the user's skeleton derived from the moving outline or silhouette image in step (d)(i) comprises at least a shoulder width of the user.

29. The method of claim 26, in which the biometrics extracted from the information about the user's skeleton derived from the moving outline or silhouette image in step (d)(i) comprises at least a height of the user.

30. The method of claim 26, in which the biometrics extracted from the information about the user's skeleton derived from the moving outline or silhouette image in step (d)(i) comprises at least a distance measured between a waist and a shoulder joint of the user.

31. The method of claim 26 in which the biometrics comprise a height of the user, and the method further comprises computing a height from a distance from a top of the gate to a shoulder and arm interface and a distance from a top of the gate to the bottom of the boot.

32. The method of claim 31, in which the access gate further comprises a plurality of markings along a vertical dimension of a side wall located such that at least some of the plurality of markings are visible in the image recorded in step (a), and the distance from the top of the gate to the shoulder and the distance from the top of the gate are derived from a comparison in the image recorded in step (a) of the location of at least one of the plurality of markings to the image of the user.

33. The method of claim 26 in which the biometrics comprise a boot size of the user.

34. The method of claim 26, in which the gate further comprises a microphone for recording a voice, and the biometrics further comprise a voice print derived from a voice recorded by the microphone.

35. The method of claim 26, in which the access gate further comprises a barcode reader, and the method further comprises reading a barcode from a tag and substituting identification read from the barcode for the identification read from the RFID enabled tag.

36. The method of claim 26, wherein if, after comparing in step (c), no matching identification is found in the first database, the method further comprises the step of keeping the at least one access door in the closed position, denying the user passage through the access gate.

37. The method of claim 26, wherein if in step (c) it is determined that the RFID enabled tag is not valid for access, the method further comprises the step of keeping the at least one access door in the closed position, denying the user passage through the access gate.

38. The method of claim 26, wherein if after comparing in step (d)(iv)(A) the biometrics derived in step (ii) do not match the biometrics stored in the second database, the method further comprises the step of keeping the at least one access door in the closed position, denying the user passage through the access gate.

39. The method of claim 26, in which the UHF radio frequency identification reader comprises at least two antennas for receiving transmissions from UHF RFID enabled tags mounted on walls of the gate defining the gate space, and when step (b) of reading the identification from the UHF RFID enabled tag occurs, the method further comprises comparing received signals at the at least two antennas to confirm that the received signals are from an RFID enabled tag in the gate space.

40. The method of claim 39, in which the method compares signal strength among the plurality of received signals.

41. The method of claim 39, in which the method compares a response delay among the plurality of received signals.

42. The method of claim 39, in which the method compares a phase difference among the plurality of received signals.

43. The method of claim 26, further comprising the step of recording statistics about accesses through the gate of an RFID enabled tag in a database.

* * * * *